(12) United States Patent
Borrelli et al.

(10) Patent No.: US 7,104,090 B2
(45) Date of Patent: Sep. 12, 2006

(54) METHOD OF MAKING POLARIZING GLASSES

(75) Inventors: Nicholas F. Borrelli, Elmira, NY (US); Donald M. Trotter, Jr., Newfield, NY (US)

(73) Assignee: Corning Incorporated, Corning, NY (US)

( * ) Notice: Subject to any disclaimer, the term of this patent is extended or adjusted under 35 U.S.C. 154(b) by 562 days.

(21) Appl. No.: 10/057,221

(22) Filed: Jan. 24, 2002

(65) Prior Publication Data

US 2003/0136152 A1    Jul. 24, 2003

(51) Int. Cl.
*C03B 37/00* (2006.01)
(52) U.S. Cl. .................. 65/32.1; 65/30.1; 65/30.13; 65/32.3; 65/30.11; 65/32.5
(58) Field of Classification Search ............. 65/32.1, 65/30.1, 30.13, 32.3, 30.11, 32.5
See application file for complete search history.

(56) References Cited

U.S. PATENT DOCUMENTS

| | | | |
|---|---|---|---|
| 3,325,299 A * | 6/1967 | Araujo | 501/13 |
| 3,540,793 A | 11/1970 | Araujo et al. | 350/147 |
| 4,125,404 A | 11/1978 | Araujo et al. | 106/54 |
| 4,304,584 A | 12/1981 | Borrelli et al. | 65/30.11 |
| 4,405,672 A * | 9/1983 | Araujo et al. | 428/68 |
| 4,479,819 A | 10/1984 | Borrelli et al. | 65/30.11 |
| 4,832,724 A * | 5/1989 | Borrelli et al. | 65/30.11 |
| 4,891,336 A | 1/1990 | Prassas | 501/13 |
| 4,908,054 A * | 3/1990 | Jones et al. | 65/30.11 |
| 4,980,318 A | 12/1990 | Araujo | 501/13 |
| 5,007,948 A | 4/1991 | Araujo | 65/30.13 |
| 5,426,077 A | 6/1995 | Brocheton et al. | 501/13 |
| 5,517,356 A | 5/1996 | Araujo et al. | 359/490 |
| 5,886,820 A | 3/1999 | Tajima et al. | 359/492 |
| 5,932,501 A | 8/1999 | Brocheton | 501/64 |
| 6,167,727 B1 | 1/2001 | Tajima et al. | 65/30.1 |
| 6,298,691 B1 | 10/2001 | Borrelli et al. | 65/30.1 |
| 6,313,947 B1 | 11/2001 | Takahashi et al. | 359/492 |
| 6,772,608 B1 | 8/2004 | Drost et al. | 65/30.1 |

\* cited by examiner

*Primary Examiner*—Dionne W. Mayes
(74) *Attorney, Agent, or Firm*—Walter M. Douglas

(57) ABSTRACT

Polarizing glass articles and methods of manufacturing polarizing glass articles are disclosed. The method involves forming a polarizing layer on the surface of the glass article by ion-exchanging silver or copper into the surface.

6 Claims, No Drawings

METHOD OF MAKING POLARIZING GLASSES

FIELD OF THE INVENTION

This invention relates to polarizing glasses. More particularly, the invention relates to methods of making polarizing glasses and polarizing articles such as optical isolators made from such glasses.

BACKGROUND OF THE INVENTION

Several methods are known for making polarizing glasses. For example, it has been demonstrated that polarizing glasses can be produced from silver halide-containing glasses by a redraw process as disclosed in U.S. Pat. No. 3,540,793 (Araujo et al.), or by subjecting stretched glass to a reducing gas atmosphere as disclosed in U.S. Pat. Nos. 4,304,584 and 4,479,819 (Borrelli et al.). In the redraw process, glass containing a separable phase is stretched or redrawn above its softening temperature, during which process, the separable phase is elongated. The thermal treatment which leads to the phase separation is carried out before the redraw process. In one version of the above process, the separated phase is initially spectrally non-absorbing material such as AgClBr, CuClBr or copper/cadmium halides, which must be subsequently modified to create a desired dichroic property necessary for the polarizing effect. This is accomplished by treating the stretched glass in a reducing gas (e.g., hydrogen) environment at elevated temperatures for sufficient time to effect the chemical reduction of the spectrally non-absorbing materials to their corresponding metals. The chemical reduction process is a combined process involving both the diffusion of hydrogen in the glass and the chemical reaction of the hydrogen with the halide phase. The polarizing behavior derives from the reduced layer. Also, when the polarizing glass is heated to the vicinity of 500° C. for any prolonged period of time, the elongated particles respheroidize and the polarizing property is lost. That is, the elongated particle returns to its spherical shape. This is explained by the fact that once the glass is soft enough, the interfacial forces act to undo what the redrawing forces had accomplished.

Hydrogen firing at elevated temperatures to change the color of glasses whose compositions contain reducible ions is also well known. A notable commercial application of that technique is found in the Corning incorporated eyewear product lines marketed under the SERENGETI® and CPF® trademarks. The color changes induced are attributed to the reduction of a portion of the silver halide in the glass to form quasi-spherical silver particles. The chemical reaction proceeds very fast relative to the hydrogen diffusion which leads to the condition of a sharp boundary between the reduced region near the surface, and the unreduced region below the surface.

In addition to silver halide-containing glasses, it has also been shown that copper and cadmium halide photochromic glasses disclosed in U.S. Pat. No. 3,325,299 can also be rendered polarizing in the darkened state when thermally softened and stretched, or otherwise elongated. This action elongates the halide crystals and is described in detail in U.S. Pat. No. 3,954,485 (Seward III, et al.). U.S. Pat. No. 5,517,356 (Araujo et al.) discloses a glass polarizer having a precipitated crystal phase selected from cuprous, cadmium and mixed cuprous-cadmium halide.

For certain applications, particularly telecommunications applications, one disadvantage of manufacturing polarizing glass elements by the methods referenced above is that phase-separated silver halide phase remains in the central layer of the glass element after the outer layer has been reduced to elemental silver. This phase-separated silver halide phase contributes to scattering of light and decreased transmission through the polarizing element. It would be desirable to provide methods capable of producing polarizing glass elements that reduce or eliminate the presence of a phase-separated phase in the central layer of the glass. Thus, there continues to be a need for new and improved methods of forming polarizing glass elements.

SUMMARY OF INVENTION

One embodiment of present invention relates to a method of manufacturing a polarizing glass article. The method includes the steps of melting a glass batch capable of precipitating silver or copper halide, cooling and shaping the melt into a glass article, and ion-exchanging silver or copper metal into the surface of the glass article. According to this embodiment, the method further includes subjecting the glass article to an elevated temperature for a period of time sufficient to generate and precipitate silver or copper halide crystals in a surface layer of the glass, elongating the glass article under stress at a temperature above the annealing point of the glass to elongate the crystals in the direction of the stress and exposing the elongated glass article to a reducing atmosphere at an elevated temperature to initiate reduction of at least a portion of the silver halide crystals to silver metal.

In preferred embodiments, the article contains a central layer containing essentially no silver or copper halide crystals. In some embodiments, the surface layer is less than 50 microns thick. In still other embodiments, the surface layer is less than 10 microns thick. An advantage of the present invention is that the concentration of silver or copper metal in the surface layer of the polarizing article can be adjusted to higher levels than can be provided by utilizing the conventional manufacturing method in which silver or copper is melted into the glass batch. In certain embodiments, the concentration of silver or copper metal in the surface layer is greater than 0.1% by weight. In other embodiments, the concentration of silver or copper metal in the surface layer is greater than 0.5% by weight.

Still another embodiment of the invention relates to a polarizing glass article including a glass having two outer layers containing elongated copper or silver metal particles and a central layer containing essentially no copper or silver halide crystals. An advantage of such a polarizing glass article is that the lack of silver or copper halide metal particles in the central layer of the polarizing glass article should reduce scattering and transmission loss in optical isolators utilizing such polarizing glass articles. Another advantage of manufacturing polarizing glass articles according to the methods described above is that higher concentrations of silver or copper metal can be incorporated in the surface layers of the article. For example, greater than 0.5% by weight of copper or silver metal can be incorporated in surface layers by using the methods of the present invention.

Additional advantages of the invention will be set forth in the following detailed description. It is to be understood that both the foregoing general description and the following detailed description are exemplary and are intended to provide further explanation of the invention as claimed.

DETAILED DESCRIPTION

Before describing several exemplary embodiments of the invention, it is to be understood that the invention is not limited to the details of construction set forth in the following description. The invention is capable of other embodiments and of being practiced or being carried out in various ways.

The manufacture of polarizing glass elements is known and described in U.S. Pat. Nos. 4,304,584 and 4,479,819, in which polarizing glass elements are manufactured by providing a silver halide-containing glass batch, stretching the glass to stretch a separable phase in the glass, and then subjecting the stretched glass to a reducing gas atmosphere to provide elongated silver metal particles.

In the present invention, the silver or copper is omitted from the batch of the host glass, and after the batch is melted to make the base glass for the polarizing glass article, silver or copper is added to the glass article by ion exchanging silver into a surface layer of the glass. One advantage of manufacturing polarizing glass articles according to the present invention is that phase-separated silver or copper halide phase is not present in a central portion of the glass article. Elimination of this silver or copper halide in the central layer results in a polarizing glass article with less light scattering in the central layer and improved transmission through polarizing glass articles such as polarizing layers in an optical isolator.

Non-limiting examples of useful compositions that can be used in accordance with embodiments of the present invention include, but are not limited to the compositions disclosed in U.S. Pat. Nos. 3,208,860; 3,548,060; 3,957,498; 4,190,451; 4,304,584 and 4,479,819, all incorporated herein by reference. Likewise, nonlimiting examples of useful cuprous-halide and/or cadmium-halide containing compositions are disclosed in U.S. Pat. Nos. 3,325,299; 5,281,562; and 5,517,356 all herein incorporated by reference. In the compositions in each of the patents referenced above, the metal that forms the polarizing glass layer, for example, silver or copper, is eliminated from the batch, and the silver or copper is added to the glass article after melting of the batch and formation of the article into its desired shape.

The glass batch can be formulated using standard glass-making materials including sand, alumina, oxides, carbonates and halides. The batch is ball milled to ensure homogeneity, and melted in a covered crucible. After casting of the bar, ion exchange can be used to add silver to at least one surface layer of the bar. A bar cast from the melt and ion exchanged can then be subjected to heat treatment to form the requisite separable silver or copper halide crystal phase. After formation of the crystal phase, the bar is then heated and stretched under stress to elongate and align the particles in the direction of the stress.

According to certain embodiments of the present invention, polarizing glass elements are provided and include a precipitated crystal phase of silver or copper halide, the crystals being elongated and oriented and only present in surface layers of the article. At least a portion of the crystals near the surface of the article are at least partially reduced to metallic silver or copper.

Ion exchange of silver or copper into surface layers of the glass articles can be accomplished by any suitable ion-exchange technique. Ion exchange pertains to the replacement of an ion in the surface of a glass article with an ion in a mixture or solution. Ion exchange has been used in the past to strengthen glass articles by, for example, replacing sodium ions with potassium, copper or lithium ions, as described in U.S. Pat. Nos. 3,524,737; 3,615,322 and 3,615,323. U.S. Pat. No. 5,007,948, which is incorporated herein by reference, describes techniques for exchanging silver ions into glass articles, and the techniques described therein can be utilized to add silver ions to the surface layers of glass articles according to the present invention. The glass compositions disclosed in U.S. Pat. No. 5,007,948 do not contain halides or precipitated phases and can not be used to manufacture polarizing glass articles. However, by utilizing the ion-exchange techniques disclosed therein on a suitable glass composition listed above will provide a polarizing glass article according to certain embodiments of the present invention.

For example, silver ions can be exchanged in the surface of glass articles containing alkali metal ions and a halide by contacting the article with an external source of silver ions at a temperature above room temperature (e.g., about 350° to 750° C.) for a sufficient period of time to replace at least a portion of the alkali metal ions in the glass with silver ions. A suitable source of silver ions could include molten silver chloride. Other suitable sources of silver metal ions are described in U.S. Pat. No. 4,125,404, which is incorporated herein by reference, describes the exchange of silver ions into glass articles by immersing the article in a molten salt bath containing a silver salt and a sodium salt at an elevated temperature. Specifically, in one example, a glass article is placed in a bath containing 36% silver nitrate and 64% sodium nitrate at a temperature of about 280° C. for a period of 8 hours. It is to be understood that these ion exchange processes are exemplary, and the present invention is not limited to any particular ion exchange process. After exchanging ions into the glass, the article can be heat treated to precipitate silver or copper halide in the surface layers only. Thereafter, the article can be stretched to elongate the silver halide particles into ellipsoids and the article can be heated in a reducing atmosphere to provide oriented silver or copper metal particles.

It will be apparent to those skilled in the art that various modifications and variations can be made to the present invention without departing from the spirit or scope of the invention. Thus, it is intended that the present invention cover modifications and variations of this invention provided they come within the scope of the appended claims and their equivalents.

What is claimed is:

1. A method of manufacturing a polarizing glass article comprising the steps of:
    melting a glass batch containing a halide;
    cooling and shaping the melt into a glass article;
    ion-exchanging silver or copper metal into the surface of the glass article;
    subjecting the glass article to an elevated temperature for a period of time sufficient to generate and precipitate silver or copper halide crystals in a surface layer of the glass;
    elongating the glass article under stress at a temperature above the annealing point of the glass to elongate the crystals in the direction of the stress; and
    exposing the elongated glass article to a reducing atmosphere at an elevated temperature to initiate reduction of at least a portion of the silver or copper halide crystals to silver metal;
    wherein the ion exchange occurs after cooling and shaping the melt into an article and before subjecting the glass article to an elevated temperature treatment for a period of time sufficient to generate and precipitate silver or copper halide crystals in a surface layer of the glass.

2. The method of claim 1, wherein the article contains a central layer containing essentially no silver or copper halide crystals.

3. The method of claim 1, wherein the surface layer is less than 50 microns thick.

4. The method of claim 1, wherein the surface layer is less than 10 microns thick.

5. The method of claim 1, wherein the concentration of silver or copper metal in the surface layer is greater than 0.1% by weight.

6. he method of claim 1, wherein the concentration of silver or copper metal in the surface layer is greater than 0.5% by weight.

* * * * *